US010941512B2

(12) United States Patent
Gwon et al.

(10) Patent No.: US 10,941,512 B2
(45) Date of Patent: Mar. 9, 2021

(54) WATER LEVEL SENSING APPARATUS AND METHOD FOR CONTROLLING CLOTHES TREATMENT APPARATUS COMPRISING SAME (71) Applicant: LG ELECTRONICS INC., Seoul (KR)

(72) Inventors: Hyeokjin Gwon, Seoul (KR); Sungha Ryu, Seoul (KR)

(73) Assignee: LG ELECTRONICS, INC., Seoul (KR)

(*) Notice: Subject to any disclaimer, the term of this patent is extended or adjusted under 35 U.S.C. 154(b) by 109 days.

(21) Appl. No.: 16/072,002

(22) PCT Filed: Jan. 13, 2017

(86) PCT No.: PCT/KR2017/000479
§ 371 (c)(1),
(2) Date: Jul. 23, 2018

(87) PCT Pub. No.: WO2017/135592
PCT Pub. Date: Aug. 10, 2017

(65) Prior Publication Data
US 2019/0024297 A1 Jan. 24, 2019

(30) Foreign Application Priority Data
Feb. 1, 2016 (KR) .................... 10-2016-0012412

(51) Int. Cl.
*G01F 23/18* (2006.01)
*D06F 39/08* (2006.01)
(Continued)

(52) U.S. Cl.
CPC ............ *D06F 39/087* (2013.01); *D06F 37/12* (2013.01); *G01F 23/18* (2013.01); *D06F 33/00* (2013.01);
(Continued)

(58) Field of Classification Search
CPC ........ G01F 22/02; G01F 23/14; D06F 39/087; D06F 37/12; D06F 33/00; D06F 2202/085; D06F 2204/084
See application file for complete search history.

(56) References Cited

U.S. PATENT DOCUMENTS 4,570,484 A * 2/1986 Sokalski ................. G01F 23/14
137/392
4,662,193 A 5/1987 Honda
(Continued)

FOREIGN PATENT DOCUMENTS

JP 2015134044 A 7/2015
KR 20-0127105 11/1996
(Continued)

OTHER PUBLICATIONS

International Search Report, dated Apr. 11, 2017.
Supplementary European Search Report, dated Mar. 7, 2019.

*Primary Examiner* — Hailey K. Do
(74) *Attorney, Agent, or Firm* — Finnegan, Henderson, Farabow, Garrett & Dunner LLP (57) ABSTRACT A clothes treatment apparatus includes a tub to store water, a drum rotatably arranged in the tub to accommodate clothes, a communication tube communicated with the tub, a pressure in the communication tube corresponding to a water level of the tub, and a chamber provided at a free end of the communication tube so that a pressure in the chamber corresponds to a water level of the tub. An elastic part is provided in the chamber and elastically deformed according to a change in pressure in the communication tube. An output unit having a plurality of resistors is provided on one surface of the elastic part to generate an electrical signal corresponding to an amount of deformation of the elastic part, and a controller is configured to receive the electrical signal and sense the water level of the tub by comparing the
(Continued)

electrical signal of the output unit with a reference electrical signal indicating a zero water level of the tub.

5 Claims, 9 Drawing Sheets

(51) Int. Cl.
*D06F 37/12* (2006.01)
*D06F 33/00* (2020.01)

(52) U.S. Cl.
CPC .. *D06F 2202/085* (2013.01); *D06F 2204/084* (2013.01)

(56) References Cited

U.S. PATENT DOCUMENTS

| | | | |
|---|---|---|---|
| 5,756,899 A | * | 5/1998 | Ugai ........................ G01F 1/383 73/714 |
| 6,292,966 B1 | | 9/2001 | Lim et al. |
| 2006/0185403 A1 | | 8/2006 | Ikemizu et al. |

FOREIGN PATENT DOCUMENTS

| | | |
|---|---|---|
| KR | 10-2004-0046793 | 6/2004 |
| KR | 10-2006-0094326 | 8/2006 |
| KR | 10-2012-0139039 | 12/2012 |
| WO | WO 03/078951 A1 | 9/2003 |

* cited by examiner

WATER LEVEL SENSING APPARATUS AND METHOD FOR CONTROLLING CLOTHES TREATMENT APPARATUS COMPRISING SAME

CLAIM FOR PRIORITY

This application is a U.S. National Phase entry under 35 U.S.C. § 371 from PCT International Application No. PCT/KR2017/000479, file Jan. 13, 2017, which claims benefit of priority of Korean Patent Application No. 10-2016-0012412, filed Feb. 1, 2016, all of which are incorporated herein by reference.

TECHNICAL FIELD

The present invention relates to a water level sensing apparatus and a method for controlling a clothes treatment apparatus including the same, and more particularly, to a water level sensing apparatus capable of automatically correcting a reference value for determining a zero water level, and a method for controlling a clothes treatment apparatus including the same.

BACKGROUND

An apparatus having a storage capable of accommodating water, for example a washing apparatus, should regulate the water level according to the operation steps. Therefore, it is necessary to correctly identify the level of water in the storage, and thus a water level sensor or the like is used for this purpose.

A measured value of the water level sensor may have an offset due to an external factor or increase of the period of use. However, in order to remove the offset, the water level sensor must be replaced. Further, even if the water level sensor is replaced with a new one, the accuracy of measurement of the water level may not be secured because there is no way to persistently correct the offset.

Technical Problem

An object of the present invention is to provide a water level sensing apparatus capable of accurately detecting a water level.

Another object of the present invention is to provide a method for controlling a clothes treatment apparatus including a water level sensing apparatus capable of automatically correcting a reference value for determining a zero water level.

TECHNICAL SOLUTION

A method is provided for controlling a clothes treatment apparatus, wherein the clothes treatment apparatus includes a tub configured to accommodate water; a drum rotatably arranged in the tub and configured to accommodate clothes; a communication tube being communicated with the tub, the communication tube forming a pressure corresponding to a water level of the tub; a chamber provided at a free end of the communication tube and communicated with the communication tub so that a pressure thereof is corresponding to a water level of the tub; an elastic part provided in the chamber and elastically deformed according to change in pressure of the communication tube; an output unit having a plurality of gage resistors provided on one surface of the elastic part to generate an electrical signal corresponding to an amount of deformation of the elastic part; and a controller configured to receive the electrical signal and sense the water level of the tub by comparing the electrical signal of the output unit with a reference electrical signal indicating a zero water level of the tub. The method includes detecting the electrical signal of the output unit; and comparing the detected electrical signal with the reference electrical signal.

In exemplary embodiments, the method may comprise: draining the water of the tub before the detecting; and correcting the reference electrical signal when a difference between the reference electrical signal and the detected electrical signal is outside a predetermined first set range.

In exemplary embodiments, the draining may form the atmospheric pressure in the first pressure chamber.

In exemplary embodiments, wherein the detecting may comprise: receiving an electrical signal from the output unit for a preset time; calculating an average value of the received electrical signal; and setting the calculated average value as the electrical signal of the output unit.

In exemplary embodiments, the detecting may be performed using a moving average method.

In exemplary embodiments, the correcting may replace the reference electrical signal with the detected electrical signal.

In exemplary embodiments, the correcting corrects the reference electrical signal by a preset magnitude.

In exemplary embodiments, the correcting may comprise outputting a warning signal when the difference between the reference electrical signal and the detected electrical signal is outside a second set range wider than the first set range.

In exemplary embodiments, the method may comprise calculating the level of the water after the comparing.

In exemplary embodiments, the method may comprise outputting control signal to control the drive unit based on the calculated water level.

In exemplary embodiments, the chamber may comprise: a first pressure chamber connected to the communication tube such that a pressure thereof is equal to a pressure of the communication tube; and a second pressure chamber communicating with an atmosphere; wherein the elastic part partitions the chamber into the first pressure chamber and the second pressure chamber and, is deformed by a difference in pressure between the first pressure chamber and the second pressure chamber.

In exemplary embodiments, the elastic part may comprise silicon.

In exemplary embodiments, the communication tube may extend from a lower side of the tub to a position higher than a maximum water level of the tub.

In exemplary embodiments, the gage resistors may be provided on a bridge circuit. In exemplary embodiments, the electrical signal may be a voltage.

In another aspect a water level sensing apparatus comprises a communication tube being communicated with a storage part configured to accommodate water, the communication tube forming a pressure corresponding to a water level of the storage part; a chamber provided at a free end of the communication tube, the chamber including: a first pressure chamber connected to the communication tube such that a pressure thereof is equal to a pressure of the communication tube; and a second pressure chamber communicating with an atmosphere; an elastic part provided in the chamber to partition the first pressure chamber and the second pressure chamber, the elastic part being elastically deformed according to change in pressure of the communication tube; and an output unit having a plurality of gage resistors provided on one surface of the elastic part to generate an electric signal corresponding to a deformation amount of the elastic part; wherein the water level of the storage part is calculated by comparing the electrical signal of the output unit with a reference value indicating a zero water level of the storage part.

In exemplary embodiments, the communication tube may extend upward to from a lower side of the storage part to a position higher than a maximum water level of the storage part.

In exemplary embodiments, the first pressure chamber and the communication tube may be filled with air so that the elastic part deforms according to a change in pressure inside the communication pipe.

In exemplary embodiments, the elastic part may comprise silicon.

In exemplary embodiments, the gage resistors may be provided on a bridge circuit.

ADVANTAGEOUS EFFECTS

A water level sensing apparatus according to one embodiment may correctly detect a water level irrespective of external environmental factors or aging.

A method for controlling a clothes treatment apparatus according to another embodiment may automatically correct a reference value for determining a zero water level, thereby securing the accuracy of water level measurement.

The effects of the present invention are not limited to the above-mentioned effects, and may be variously extended without departing from the spirit and scope of the present invention.

DETAILED DESCRIPTION

Hereinafter, preferred embodiments of the present invention will be described in detail with reference to the accompanying drawings. It is to be understood, however, that specific structural and functional embodiments are provided by way of illustration only, and are not intended to limit the invention to the particular forms disclosed. It is to be understood that the present invention includes all modifications, equivalents, and alternatives that fall within the spirit and scope of the invention. The same reference numbers will be used throughout the drawings to refer to the same or like parts, and redundant description of the same constituent elements will be omitted.

Figure 1:
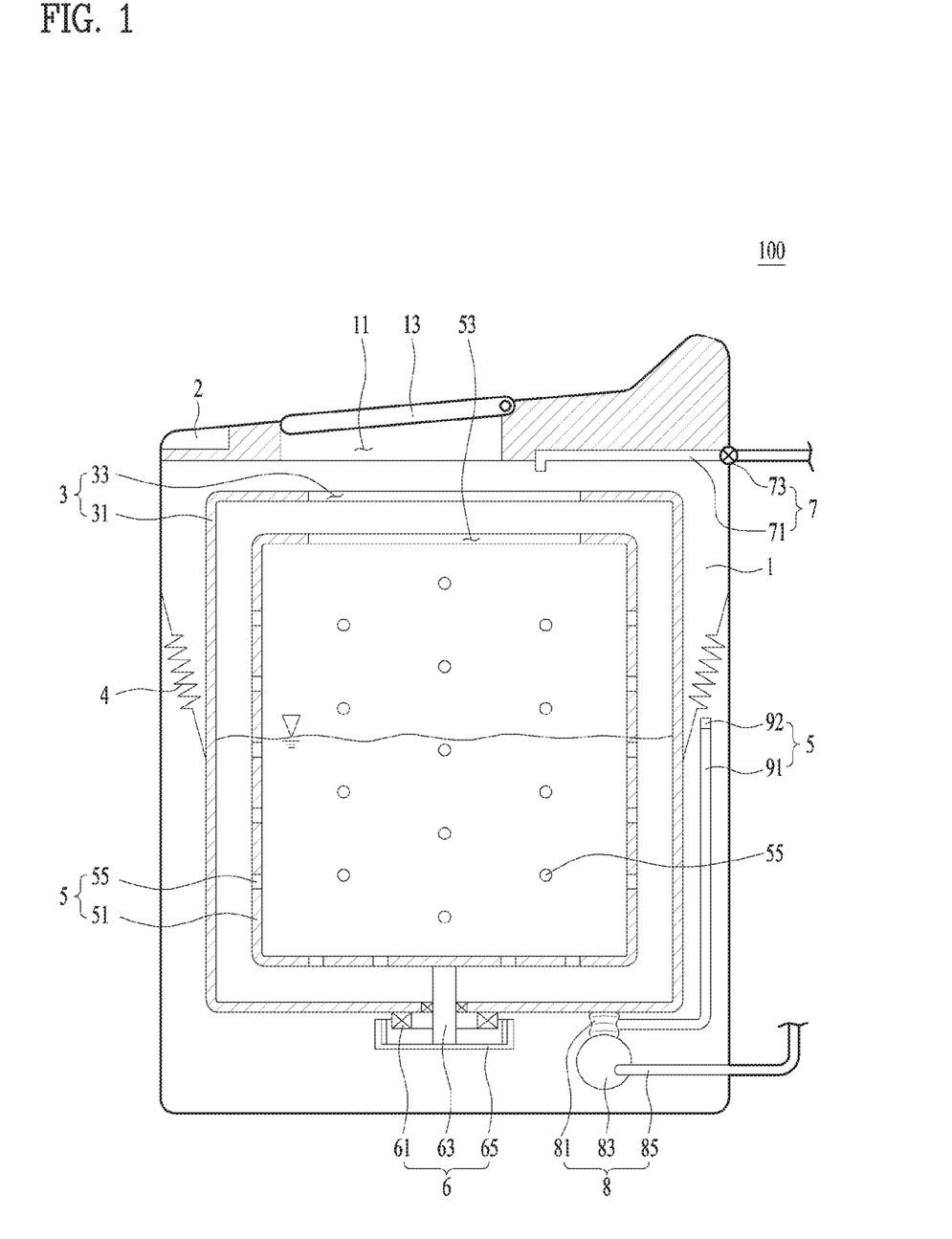
FIG. 1 is a cross-sectional view showing a washing apparatus.
Figure 2:
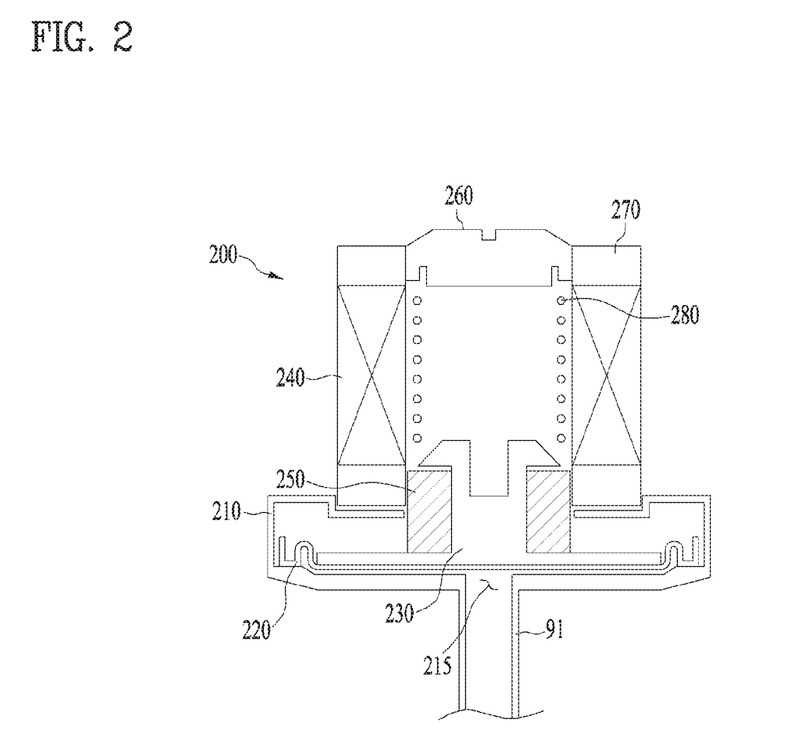
FIG. 2 is a cross-sectional view showing a water level sensor according to an embodiment of the present invention.
Figure 3:
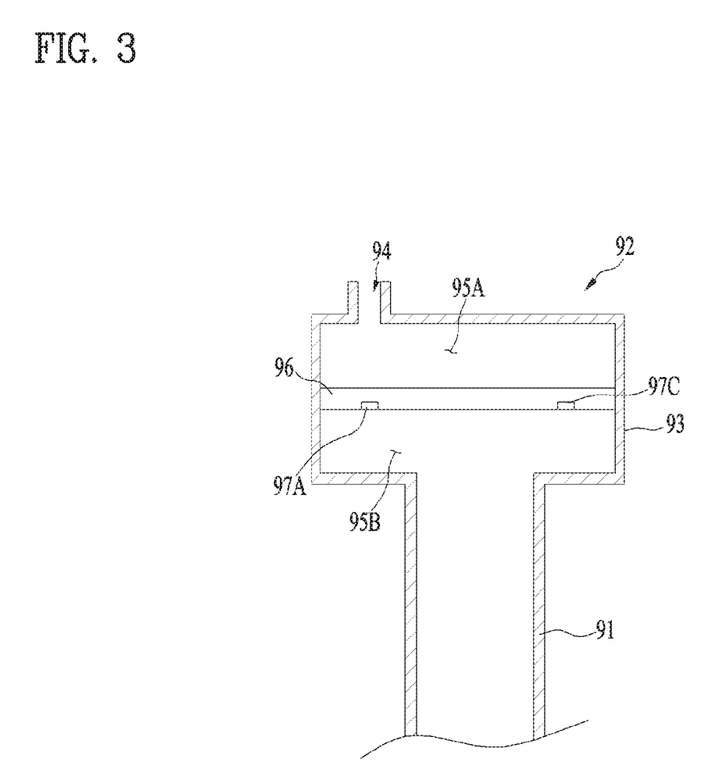
FIG. 3 is a cross-sectional view showing a water level sensor according to another embodiment of the present invention.
Figure 4:
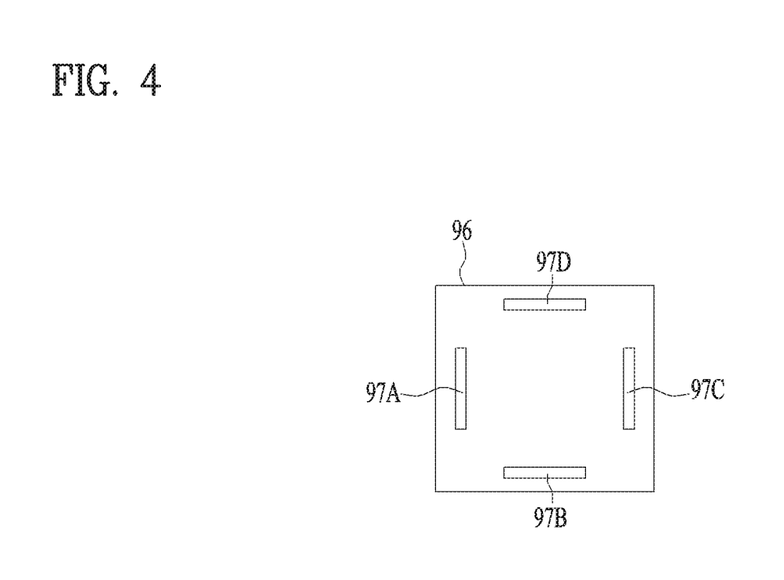
FIG. 4 is a diagram showing gage resistors of FIG. 3.
Figure 5:
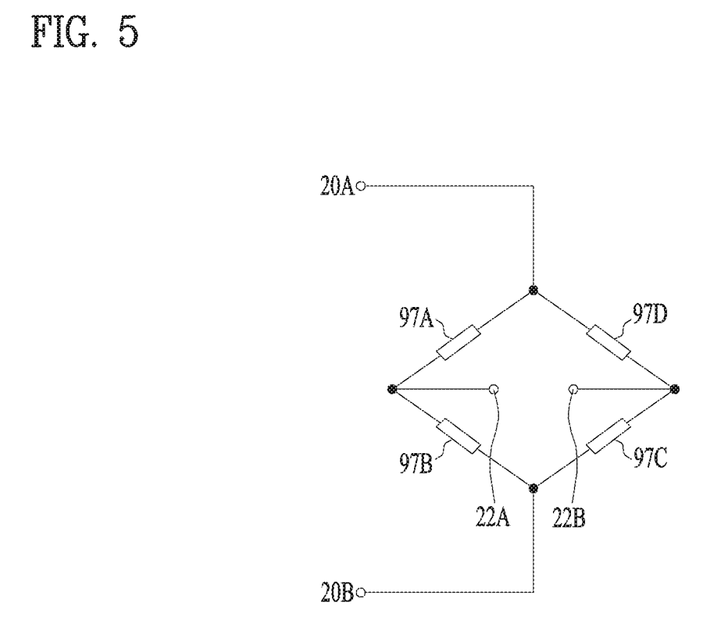
FIG. 5 shows a bridge circuit including the gage resistors of FIG. 3.
Figure 6:
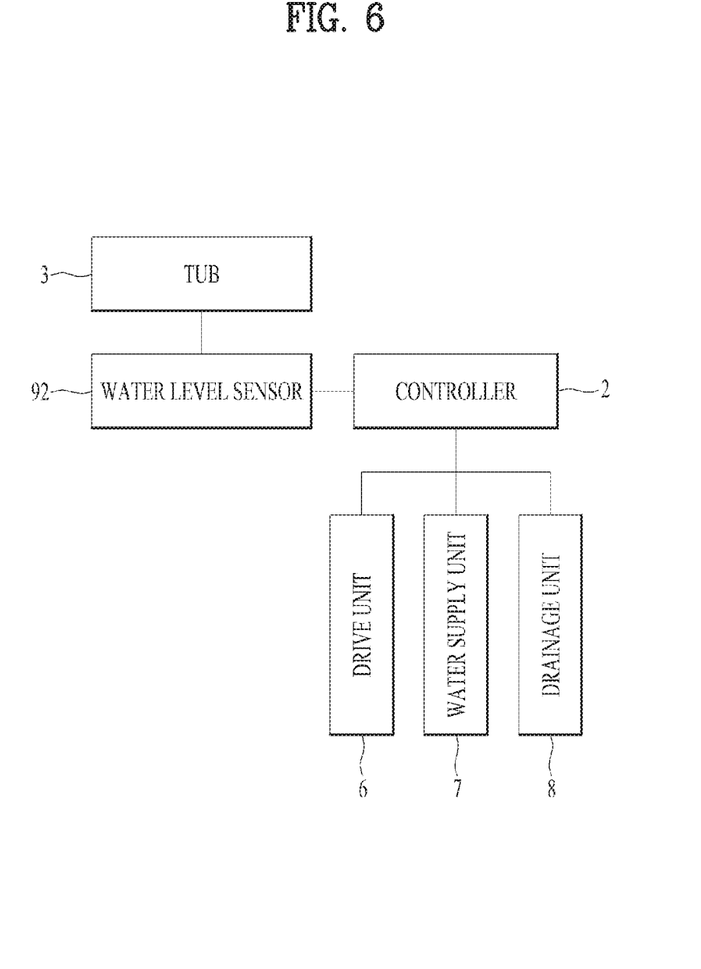
FIG. 6 is a block diagram showing a washing apparatus including a water level sensor.
Figure 7:
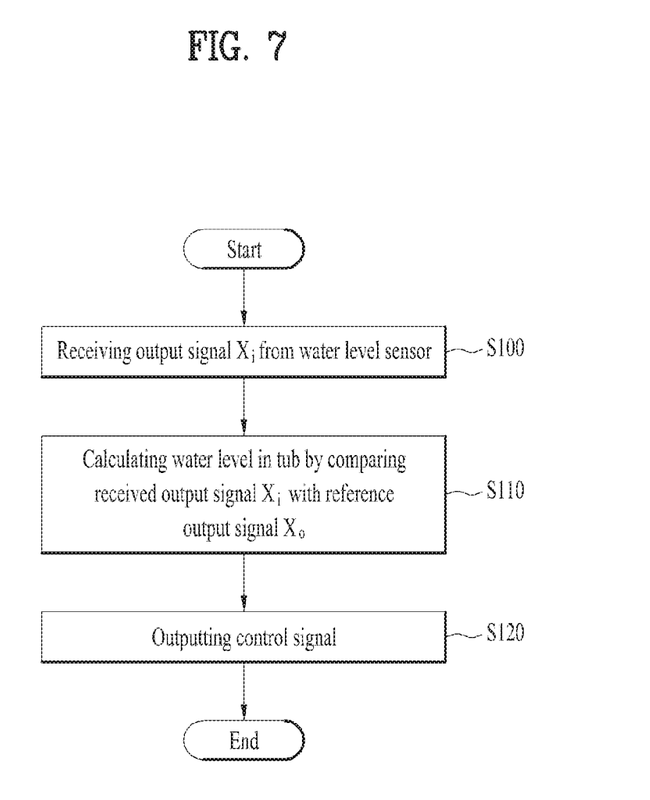
FIG. 7 is a flowchart illustrating a method for controlling a washing apparatus using a water level sensor.

FIG. 1 is a cross-sectional view showing a washing apparatus. FIG. 2 is a cross-sectional view showing a water level sensor according to an embodiment of the present invention. FIG. 3 is a cross-sectional view showing a water level sensor according to another embodiment of the present invention. FIG. 4 is a diagram showing gage resistors of FIG. 3. FIG. 5 shows a bridge circuit constituted by the gage resistors of FIG. 3. FIG. 6 is a block diagram showing a washing apparatus including a water level sensor. FIG. 7 is a flowchart illustrating a method for controlling a washing apparatus using a water level sensor.

FIG. 1 shows a clothes treatment apparatus, in particular, a washing apparatus, but the present invention is not limited thereto, and may be applied to various kinds of apparatuses that use water. For example, the present invention may be applied to a clothes treatment apparatus other than the washing apparatus, a refrigerator, and the like. Hereinafter, for purposes of simplicity of explanation, only the washing apparatus will be described.

Referring to FIGS. 1 and 2, a washing apparatus 100 includes a cabinet 1, a tub 3 arranged in the cabinet 1 to store wash water, a support part 4 configured to support the tub 3, a water supply unit 7 configured to supply wash water into the tub 3, a drainage unit 8 configured to discharge the wash water from the tub 3, a drum 5 configured to accommodate clothes in the tub 3, a drive unit 6 configured to rotate the drum 5, a water level sensing unit 9 configured to measure a level of wash water in the tub 3, and a controller 2 configured to control the washing apparatus 100.

The cabinet 1 defines an appearance of the washing apparatus 100 and may include a loading port 11 through which clothes may be inserted and removed and a door 13 to open and close the loading port 11. The door 13 may be rotatably coupled to the cabinet 1, and the loading port 11 may be opened or closed according to rotation of the door 13.

While FIG. 1 shows that the washing apparatus 100 has the loading port 11 and the door 13 which are formed at the top of the cabinet 1 and the drive unit 6 arranged under the tub 3, embodiments are not limited thereto. The loading port 11 and the door 13 may be formed in the front portion of the cabinet 1 and the drive unit 6 may be formed on the back of the tub 3. Hereinafter, for simplicity of explanation, it is assumed that the loading port 11 and the door 13 are formed at the top of the cabinet 1 and the drive unit 6 is arranged under the tub 3.

The tub 3 may be arranged in the cabinet 1 and store wash water. The tub 3 may include a tub body 31 configured to store wash water and a tub inlet 33 provided in the top surface of the tub body 31 and communicating with the loading port 11. For example, the tub body 31 may have a cylindrical shape.

The tub 3 may be supplied with water from the outside through the water supply unit 7 and may discharge water to the outside through the drainage unit 8.

The water supply unit 7 may include a water supply tube 71 connected to an external water supply source and a water supply valve 73 configured to open and close the water supply tube 71 under control of the control unit 2.

The drainage unit 8 may include a drainage pump 83 arranged outside the tub body 31, a first drainage tube 81 connected to the drainage pump 83 through the bottom surface of the tub body 31, and a second drainage tube 85 configured to guide the wash water discharged from the drainage pump 83 to the outside of the cabinet 1. In this case, the drainage pump 83 may be operated under control of the controller 2.

The support part 4 may fix the tub body 31 to the inner wall of the cabinet 1, and attenuate vibration to prevent the tub body 31 from rocking. For example, the support part may include an elastic member.

The drum 5 may include a drum body 51 rotatably arranged in the tub body 31 and a drum inlet 53 through which clothes may be inserted and removed. For example, the drum body 51 may have a cylindrical shape. The drum inlet 53 may communicate with the loading port 11 and the tub inlet 33. Thus, the clothes may be introduced into the drum body 51, sequentially passing through the loading port 11, the tub inlet 33, and the drum inlet 53.

A plurality of through holes 55 communicating with the tub body 31 may be formed in the inner circumferential surface of the drum body 51. The wash water accommodated in the tub body 31 may be supplied into the drum body 51 through the through holes 55, and the wash water inside the drum body 51 may be discharged to the tub body 31 through the through holes 55.

The drive unit 6 may be arranged under the tub 3 and be connected to the drum 5 through the bottom surface of the tub body 31. The drive unit 6 may rotate the drum 5 under control of the controller 2.

The drive unit 6 may include a stator 61 configured to generate a magnetic field upon receiving a current, a rotor 63 rotated by the magnetic field, and a rotary shaft 65 connecting the rotor 63 and the drum body 51.

The stator 61 may be fixed to the tub body 31 on the outside of the tub body 31 and the rotary shaft 65 may connect the drum body 51 and the rotor 63 through the bottom surface of the tub body 31. In this case, a bearing for rotatably supporting the rotary shaft 65 may be further provided on the bottom surface of the tub body 31.

The controller 2 may be installed on the front surface of the upper end of the cabinet 1. The controller 2 may acquire water level information about the wash water accommodated in the tub 3 from a water level sensing unit 9, which will be described later, and output control signals for controlling the drum 5, the drive unit 6, the water supply unit 7, and the drainage unit 8. The controller 2 may further include a display unit configured to output various kinds of information and an input unit configured to receive operation information from the user.

The water level sensing unit 9 may include a communication tube 91 communicating with the first drainage tube 81 and having one end extending vertically upward and a water level sensor 92, 200 sealing the free end of the communication tube. Here, the free end means one end of the communication tube extending in the vertical direction.

One end of the communication tube 91 may extend vertically upward, and the other end thereof may communicate with the first drainage tube 81. In this case, one end of the communication tube 91 may extend to a position higher than the highest water level formed in the tub 3. Since the water level in the communication tube 91 is operatively connected with the wash water level in the tub body 31, air may constantly remain in the upper portion of the communication tube 91. The pressure of the air stored in the upper portion of the communication tube 91 may vary depending on the wash water level in the tub 3. That is, when the level of wash water in the tub body 31 rises, the water level of the communication tube 91 may also rise, and the air in the communication tube 91 may be compressed. On the other hand, when the level of wash water in the tub body 31 falls, the water level of the communication tube 91 may also fall, and the air in the communication tube 91 may be less compressed. Accordingly, the pressure formed by the air in the communication tube 91 may be changed according to change in level of the wash water in the tub body 31.

The water level sensor 92, 200 may sense a change in pressure of the air stored in the communication tube 91 and output an electrical signal corresponding thereto. The controller 2 may receive the electrical signal output from the water level sensor 92, 200 and determine the level of the wash water accommodated in the tub 3 based on the electrical signal.

Referring to FIG. 2, the water level sensor 200 may include a housing 210 defining a body thereof, an air introduction port 215 formed at a lower portion of the housing 210 and connected to the free end of the communication tube 91, a diaphragm 220 arranged in the housing 210 and configured to be elastically deformed by the air pressure transmitted through the air introduction port 215, a core holder 230 contacting the top of the diaphragm 220, a coil 240 installed in a cylindrical shape on the inner wall of the housing 210 so as to surround the core holder 230, a core 250 accommodated in the core holder 230 and configured to slidably move in the inner space of the coil 240 in the vertical direction according to deformation of the diaphragm 220, a support member 270 configured to support the upper end of the coil 240, a cap 260 configured to close a top opening of the support member 270, an elastic member 280 configured to provide force to move the core 250 downward, and an output unit configured to generate an electrical signal according to a change in magnetic flux density of the coil 240. For example, the elastic member may be a spring, and the electrical signal may be a voltage.

Regarding operation of the water level sensor 200, the state of the core 250 that remains outside the coil 240 may be set as a state in which all the wash water in the tub 3 has been discharged. When the level of wash water rises from the aforementioned state in the tub 3, the core 250 may slidably move upward in the coil 240, and the level of the wash water may be identified using the amount of movement of the core 250.

Specifically, when wash water flows into the tub 3, a pressure corresponding to the wash water level is formed in the communication tube 91 and the air introduction port 215. This pressure deforms the diaphragm 220. Accordingly, the core holder 230 and the core 250 may rise in the vertical direction, and the inductance of the coil 240 may be changed. At this time, the amount of increase in the inductance of the coil 240 may be proportional to the amount of vertical rise of the core 250. The output unit may generate an electrical signal corresponding to the inductance of the coil 240. The controller 2 may receive the electrical signal and compare the electrical signal with a pre-stored reference value to determine the level of the wash water in the tub 3.

However, since the water level sensor 200 uses a change in the magnetic flux density according to the intensity of the magnetic field, it may undergo hysteresis. That is, it may not correctly measure the water level due to low linearity.

Hereinafter, a water level sensor 92 according to another embodiment of the present invention will be described. The water level sensor 92 may sense a change in pressure instead of the change in the magnetic flux density and generate a corresponding electrical signal.

Referring to FIGS. 3 to 5, the water level sensor 92 may include a chamber 93 defining an outer shape thereof and configured to seal the free end of the communication tube 91, an elastic part 96, and an output unit configured to generate an electrical signal.

The chamber 93 may include a first pressure chamber 95B connected to the communication tube 91 and a second pressure chamber 95A partitioned from the first pressure chamber 95B by the elastic part 96.

Since the first pressure chamber 95B is connected to the communication tube 91, a pressure equal to the pressure formed by the air in the communication tube 91 may be formed in the first pressure chamber 95B. Since the pressure formed by the air in the communication tube 91 varies depending on the level of the wash water accommodated in the tub 3, the pressure formed in the first pressure chamber 95B may also vary depending on the level of the wash water in the tub 3. The second pressure chamber 95A may communicate with the atmosphere through the opening 94. Accordingly, the atmospheric pressure may be formed in the second pressure chamber 95A.

The elastic part 96 may be arranged between the second pressure chamber 95A and the first pressure chamber 95B and be elastically deformed by a difference in pressure between the first pressure chamber 95B and the second pressure chamber 95A. At this time, since the pressure in the second pressure chamber 95A is constantly atmospheric pressure, the elastic part 96 may be elastically deformed according to the change in pressure of the first pressure chamber 95B. For example, the elastic part may be formed by chemically etching single-crystal silicon.

The output unit may include a plurality of gage resistors 97A, 97B, 97C and 97D arranged on one surface of the elastic part 96. While it is illustrated in FIG. 3 that the gage resistors 97A, 97B, 97C, and 97D are installed on the bottom surface of the elastic part 96, embodiments are not limited thereto. For example, the gage resistors may be installed on the top surface of the elastic part 96, namely, may be arranged so as to face the second pressure chamber 95A.

The resistances of the gage resistors 97A, 97B, 97C and 97D may vary depending on the difference in pressure between the second pressure chamber 95A and the first pressure chamber 95B. Here, since the pressure in the second pressure chamber 95A is constantly atmospheric pressure, the resistance of the gage resistors 97A, 97B, 97C and 97D may be changed when the pressure in the first pressure chamber 95B is changed. Specifically, when the pressure in the communication tube 91 and the first pressure chamber 95B changes according to the change in the water level of the tub 3, stress may be produced in the elastic part 96 by the piezoresistive effect, and the resistances of the gage resistors 97A, 97B, 97C and 97D may be changed. The output unit may generate an electrical signal corresponding to the resistances of the gage resistors 97A, 97B, 97C, 97D. For example, the electrical signal may be a voltage. The controller 2 may receive the electrical signal and compare the electrical signal with a pre-stored reference value to determine the level of the wash water in the tub 3.

As shown in FIG. 5, the gage resistors 97A, 97B, 97C and 97D may constitute a bridge circuit, for example a Wheatstone bridge. Therefore, even when the input voltage at the input terminals 20A and 20B is constant, the output voltage at the output terminals 22A and 22B may be changed according to the change in resistance of the gage resistors 97A, 97B, 97C, and 97D. The controller 2 may receive the output voltage and determine the level of the wash water accommodated in the tub 3.

Referring to FIGS. 6 and 7, the water level sensor 92, 200 may receive, through the communication tube 91, the pressure generated by the wash water contained in the tub 3. The water level detection sensor 92, 200 may generate an electrical signal $X_i$ corresponding to the pressure and output the same to the controller 2. The controller 2 may receive the electrical signal $X_i$ (S100) and calculate the level of the wash water by comparing the magnitude of a pre-stored reference electrical signal $X_o$ with the magnitude of the received electrical signal $X_i$ (S110).

In this case, the electrical signal $X_i$ may refer to the value of a current electrical signal detected by the water level sensor 92, 200, and the reference electrical signal $X_o$ may be a value stored in the controller 2 that indicates a state in which the level of the wash water in the tub 3 is zero. For example, the electrical signal may be a voltage. The controller may output control signals for controlling the drive unit 6, the water supply unit 7 and the drainage unit 8, based on the calculated wash water level (S120).

The controller 2 may determine validity of the reference electrical signal $X_o$ by comparing the electrical signal $X_i$ detected by the water level sensor 92, 200 with the reference electrical signal $X_o$ with all the wash water discharged. That is, if the received electrical signal $X_i$ has an offset, the controller may determine that the reference electrical signal $X_o$ is no longer valid, and reset the reference electrical signal $X_o$. Thereby, the accuracy of water level measurement may be improved. Details will be described with reference to FIGS. 8 and 9.

Figure 8:
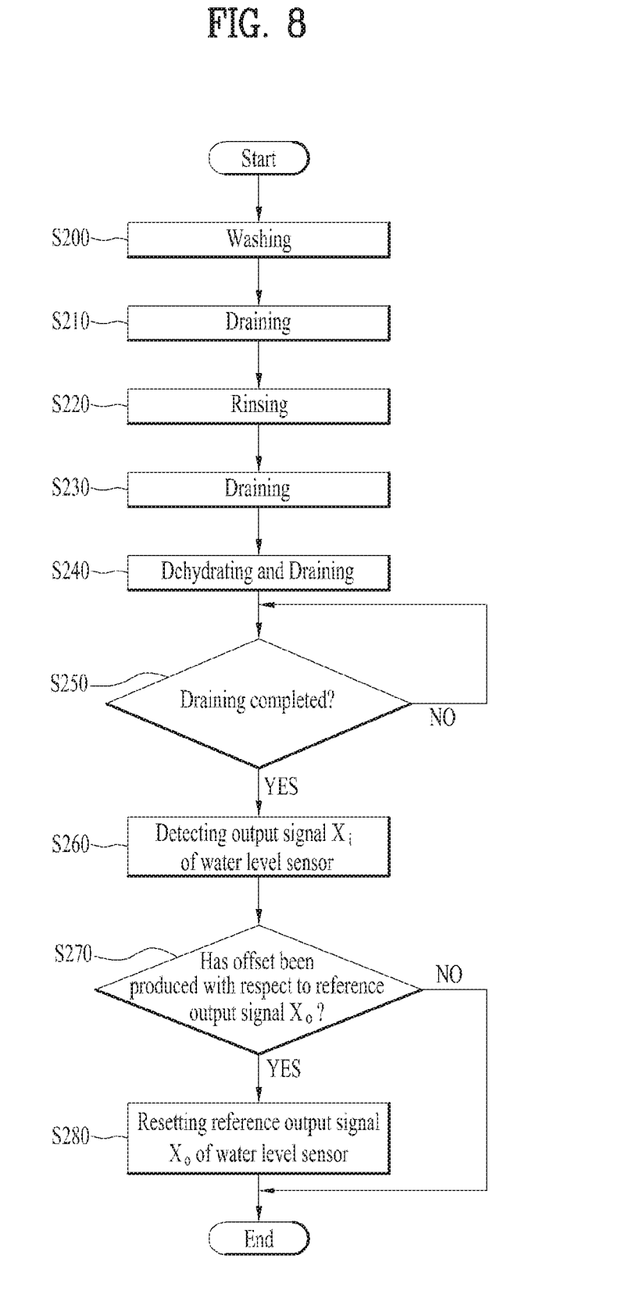
FIG. 8 is a flowchart illustrating a method for resetting a reference electrical signal of a water level sensor.
Figure 9:
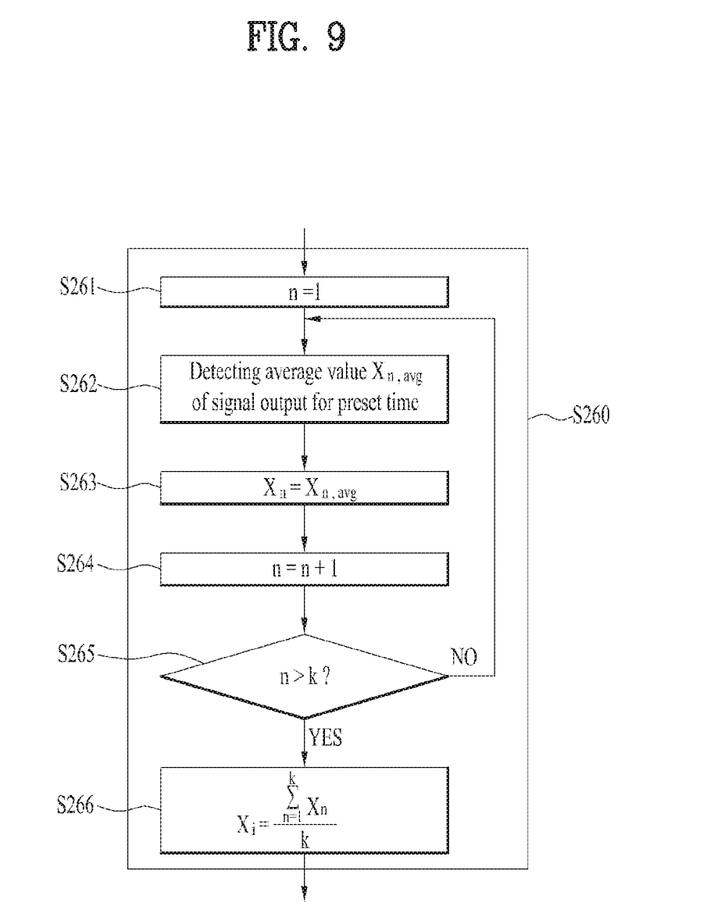
FIG. 9 is a flowchart illustrating the step of detecting an electrical signal of the water level sensor of FIG. 8.

FIG. 8 is a flowchart a method for resetting a reference electrical signal of a water level sensor. FIG. 9 is a flowchart illustrating the step of detecting an electrical signal of the water level sensor of FIG. 8. Here, for simplicity of explanation, only a method for resetting the reference electrical signal using the water level sensor 92 shown in FIG. 3 will be described.

Referring to FIGS. 8 and 9, after clothes are put in the drum body 51, a washing step S200, a rinsing step S220, and a dewatering step S240 are sequentially performed. A draining step S210, S230 may be added after the washing step and the rinsing step, respectively, and the dehydrating step and the drainage step may be performed simultaneously.

Thereafter, it is checked whether or not all the wash water stored in the tub body 31 has been discharged (S250).

For example, if no current is supplied to the drainage pump 83, it may be determined that the dehydrating and drainage step S240 is completed and all the wash water has been discharged from the tub body 31. At this time, by driving the drainage pump 83 once more, completion of discharge of the wash water may be secured.

Once all the wash water accommodated in the tub body 31 is discharged to the outside through the first and second drainage tubes 81 and 85, all the wash water in the communication tube 91 may also be discharged to the outside. Accordingly, the atmospheric pressure may be formed in the communication tube 91 and the first pressure chamber 95B of the water level sensor 92.

Once discharge of the wash water is completed, the electrical signal $X_i$ of the water level sensor 92 is detected (S260).

The water level sensor 92 may generate a specific electrical signal through the piezoelectric effect. For example, the electrical signal may be a voltage. Specifically, the elastic part 96 of the water level sensor 92 may be elastically deformed by the difference in pressure between the second pressure chamber 95A and the first pressure chamber 95B. Thereby, stress may be produced in the elastic part 96, and the resistance of the gage resistors 97A, 97B, 97C and 97D formed on one surface of the elastic part 96 may be changed by the stress. Since the gage resistors 97A, 97B, 97C and 97D constitute a bridge circuit, a specific voltage may be formed at the output terminals 22A and 22B in accordance with change in resistance. The controller 2 may receive the voltage signal from the water level sensor 92 and set the received voltage signal as the electrical signal $X_i$ of the water level sensor 92.

In exemplary embodiments, the controller 2 may receive voltage signals from the water level sensor 92 for a preset time and set the average of the received voltage signals as the electrical signal $X_i$ of the water level sensor 92. The voltage signal generated by the water level sensor 92 may also be varied by external factors other than the wash water level. By setting the average of the received voltage signals as the electrical signal $X_i$, the controller 2 may eliminate the external factors and acquire a highly reliable value of the electrical signal $X_i$.

In exemplary embodiments, the step of detecting the electrical signal $X_i$ of the water level sensor 92 may be performed using a moving average method. The moving average method is a method of estimating the average by shifting the average of the previous section to the next section and refers to estimating an average by moving from one section to another so as to determine change of the trend.

For example, the controller 2 may execute the electrical signal reception step and the average value calculation step a plurality of times, and set the average of the calculated average electrical signal values as the electrical signal $X_i$ of the water level sensor 92.

Specifically, as shown in FIG. 9, the controller 2 detects a first average value $X_{1,\ avg}$ of an electrical signal output from the water level sensor 92 for a preset time (S261, S262, S263). Then, this process is repeated four more times to detect second to fifth average values $X_{2,\ avg}$, $X_{3,\ avg}$, $X_{4,\ avg}$, $X_{5,\ avg}$ (S265). The controller 2 may set the average of the detected first to fifth average values $X_{1,\ avg}$, $X_{2,\ avg}$, $X_{3,\ avg}$, $X_{4,\ avg}$, $X_{5,\ avg}$ as the electrical signal $X_i$ of the water level sensor 92 (S266).

Subsequently, the validity of the reference electrical signal $X_o$ stored in the controller 2 is determined (S270). In this case, the reference electrical signal $X_o$ may be a reference value stored in the controller 2, indicating a state in which the level of wash water in the tub 3 is zero.

The controller 2 compares the electrical signal $X_i$ detected by the water level sensor 92 with the reference electrical signal $X_o$. Since all the wash water in the tub 3 has been discharged, it may be determined that the reference electrical signal Xo is no longer valid if the detected electrical signal $X_i$ is different from the reference electrical signal Xo. That is, if an offset is produced with respect to the reference electrical signal Xo, it may be determined that the reference electrical signal Xo is no longer valid.

If the difference between the detected electrical signal $X_i$ and the reference electrical signal Xo is outside a predetermined first set range, the controller 2 resets the reference electrical signal Xo (S280).

For example, the value of the reference electrical signal Xo may be replaced with the value of the detected electrical signal Xi. Thereby, the accuracy of water level measurement may be secured.

Alternatively, the reference electrical signal Xo may be corrected only by a predetermined magnitude. For example, even when the difference between the reference electrical signal Xo and the detected electrical signal $X_i$ is as large as 50% of the value of the reference electrical signal Xo, the value of the reference electrical signal Xo may be corrected only by 10% and this operation may be repeated five times, thereby causing the reference electrical signal Xo to converge on the value of the detected electrical signal $X_i$. This is intended to buffer a sudden change in the reference value.

If the difference between the detected electrical signal $X_i$ and the reference electrical signal Xo is outside a predetermined second set range, it may be determined that there is an abnormality in the water level sensor 92, and a warning signal may be output. For example, a visual warning signal may be output through a display unit (not shown) arranged outside the cabinet 1, or a user may be warned using an alarm or the like. In this case, the user may restore the accuracy of water level measurement by replacing the water level sensor 92.

As described above, the method for controlling the water level sensing apparatus according to exemplary embodiments may reset the reference value serving as a reference for water level determination. Thereby, the offset of the water level sensor produced due to aging may be eliminated, and the accuracy of water level measurement may be secured.

What is claimed is:

1. A water level sensing apparatus comprising:
a communication tube being communicated with a storage configured to accommodate water, the communication tube including a free end in which air is trapped, with a pressure of the air trapped in the free end of the communication tube corresponding to a water level of the storage;
a chamber provided at the free end of the communication tube, the chamber including: a first pressure chamber connected to the communication tube such that a pressure in the first pressure chamber is equal to a pressure of the air trapped in the free end of the communication tube; and a second pressure chamber communicating with an atmosphere;
an elastic plate provided in the chamber and configured to partition the chamber into the first pressure chamber and the second pressure chamber, the elastic plate being elastically deformed according to a change in pressure of the air trapped in the free end of the communication tube;
an output unit having a plurality of gage resistors provided on one surface of the elastic plate to generate an electric signal corresponding to a deformation amount of the elastic plate; and
a controller configured to calculate the water level of the storage by comparing the electrical signal of the output unit with a reference value indicating a zero water level of the storage,
wherein the plurality of gage resistors are respectively disposed in parallel with side edges of the elastic plate, and
wherein the plurality of gage resistors includes at least two pairs of gage resistors, the gage resistors of each of the at least two pairs face each other, and an extension direction of one of the at least two pairs of gage resistors is perpendicular to an extension direction of another of the at least two pairs of gage resistors.

2. The water level sensing apparatus according to claim 1, wherein the communication tube extends upward from a lower side of the storage to a position higher than a maximum water level of the storage.

3. The water level sensing apparatus according to claim 1, wherein the first pressure chamber and a portion of the communication tube are filled with air so that the elastic plate deforms according to a change in pressure inside the communication tube.

4. The water level sensing apparatus according to claim 1, wherein the elastic plate comprises silicon.

5. The water level sensing apparatus according to claim 1, wherein the gage resistors are provided on a bridge circuit.

* * * * *